United States Patent [19]

Dochnahl

[11] 4,165,083

[45] Aug. 21, 1979

[54] ARRANGEMENTS FOR RETAINING AND SEALING WINDOW GLASS

[75] Inventor: Johann Dochnahl, Willich, Fed. Rep. of Germany

[73] Assignee: Draftex Development AG, Switzerland

[21] Appl. No.: 884,473

[22] Filed: Mar. 8, 1978

[30] Foreign Application Priority Data

Mar. 11, 1977 [GB] United Kingdom ............... 10337/77

[51] Int. Cl.² .......................... E06B 7/22; F16J 15/16
[52] U.S. Cl. .................. 277/184; 277/206 R; 296/93; 52/718
[58] Field of Search .......................... 52/403, 716–718; 296/93; 277/182, 184, 206 R

[56] References Cited

U.S. PATENT DOCUMENTS

| | | | |
|---|---|---|---|
| 2,456,175 | 12/1948 | Coppock et al. | 296/93 X |
| 2,606,635 | 8/1952 | Clingman | 52/716 X |
| 2,610,713 | 9/1952 | Bradley | 52/717 X |
| 2,671,541 | 3/1954 | Kramer | 52/716 X |
| 3,354,584 | 11/1967 | Parsons | 52/718 X |
| 3,634,991 | 1/1972 | Barton et al. | 52/718 |
| 3,774,363 | 11/1973 | Kent | 52/718 X |

FOREIGN PATENT DOCUMENTS

| | | | |
|---|---|---|---|
| 622586 | 6/1961 | Canada | 52/717 |
| 2437536 | 2/1976 | Fed. Rep. of Germany | 52/716 |
| 352800 | 4/1961 | Switzerland | 52/718 |

*Primary Examiner*—Robert S. Ward, Jr.
*Attorney, Agent, or Firm*—Leydig, Voit, Osann, Mayer & Holt, Ltd.

[57] ABSTRACT

To hold windshield glass in position on a vehicle, a sealing member is used which has two parallel side-by-side oppositely facing channels, one of which fits over a flange around the opening, and the other of which grips the periphery of the window glass. A stiff metal retaining member of generally channel-shape is removably fixed to the window surround as by means of threaded bolts or pins and wedges and holds the sealing member on the flange. Finally, a decorative beading covers and is fixed to the retaining member.

11 Claims, 8 Drawing Figures

ARRANGEMENTS FOR RETAINING AND SEALING WINDOW GLASS

BACKGROUND OF THE INVENTION

The invention relates to windows and more particularly to arrangements for sealing and retaining glass (which term is used herein to include like transparent or translucent media) in window openings such as, for example, window openings in vehicle bodies, particularly windshield openings.

In fixing a window glass in an opening, it is necessary for the fixing arrangement to be simple and quick to use, to provide an effective weatherproof seal, and to provide secure retention of the window glass. These requirements are particularly important in fixing arrangements for fixing glass in a windshield opening in a motor vehicle body; and in that application it is especially important that the fixing arrangement provides secure retention of the glass so as to hold it in position even when struck forcibly by, for example, an occupant of the vehicle in the event of a crash. In fact, such a requirement is not only desirable but is required by official regulations.

However, it will be appreciated that any fixing arrangement, while securely retaining the glass in position, should also be such as to be easy to use so as both to minimise production costs and to ease replacement of the window glass in case of breakage. Furthermore, it should provide a proper weather seal and be pleasing in appearance.

A sealing and retaining arrangement for retaining glass in a windshield opening is known in which the glass is primarily held in position by means of a layer of adhesive between the glass and the flange around the opening. In addition, clips are placed at intervals around the opening and mounted on the flange, these clips having extensions directed both inwardly and outwardly of the window opening, and these extensions hold decorative moldings. In such an arrangement, the glass is primarily held in position by the adhesive, and use of adhesive complicates the fitting operation.

It is an object of the invention to provide an improved sealing and retaining arrangement for sealing and retaining a window glass in position in a window opening.

BRIEF SUMMARY OF THE INVENTION

According to the invention, there is provided a sealing and retaining arrangement for sealing and retaining window glass in a window opening defined by a surround which supports a flange running around the opening, comprising flexible sealing means on or for mounting on the flange and providing a channel which is arranged for receiving an edge of the window glass and for running along the length of at least a portion of the flange, a stiff retaining member shaped to make contact with an external surface of the sealing means, and locking means for releasably locking the retaining member to the surround so that it retains the sealing means on the flange.

DESCRIPTION OF THE DRAWINGS

Methods according to the invention, and arrangements embodying the invention, for sealing and retaining a windshield glass in a windshield opening of a motor vehicle body, will now be described by way of example only and with reference to the accompanying diagrammatic drawings in which.

DESCRIPTION OF PREFERRED EMBODIMENTS

Figure 1:
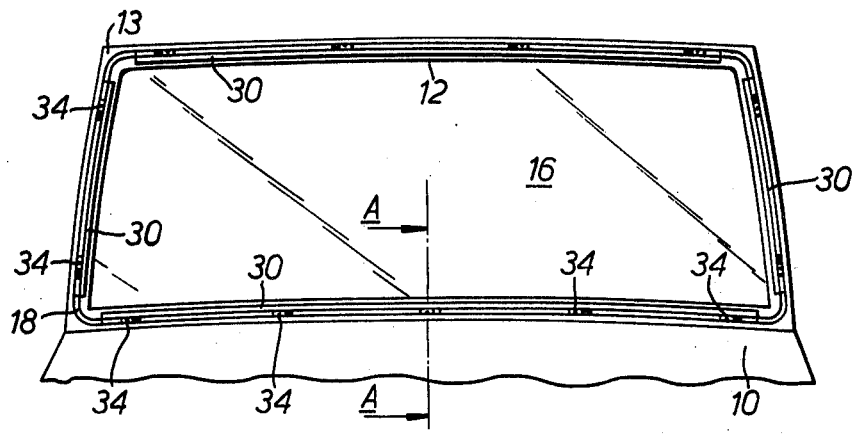
FIG. 1 is an elevation of the windshield opening of a motor vehicle body with the windshield in position and held therein by the arrangement to be described.
Figure 2:
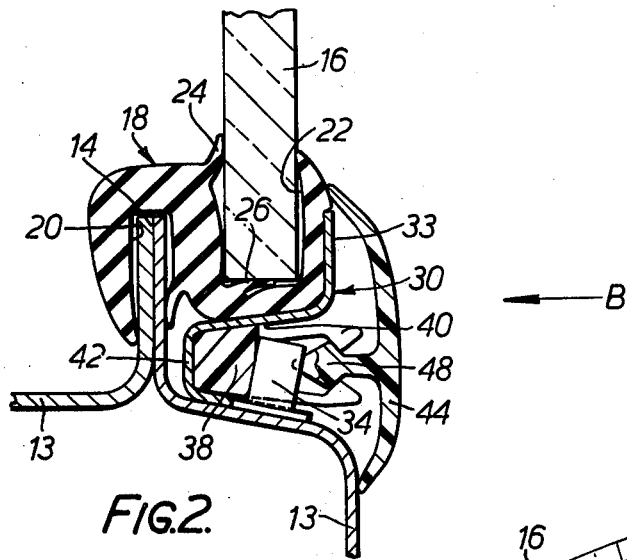
FIG. 2 is a section on the line A—A of FIG. 1 illustrating one form of the arrangement in more detail.
Figure 3:
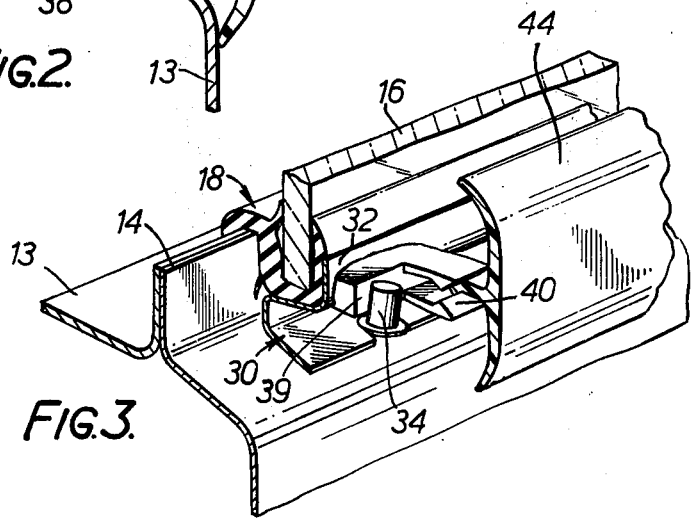
FIG. 3 is a perspective view of the arrangement of FIG. 2, looking in the direction of the arrow B of FIG. 2 and with parts broken away.

As shown in FIGS. 1, 2 and 3 particularly, the vehicle body 10 has an opening 12 for receiving the windshield, the opening 12 being defined by surround 13 having a flange 14 (FIG. 2) which runs around the opening. For supporting and sealing the windshield 16 itself in the opening 12, there is provided a double-channel seal 18. The seal 18 may be made of rubber or plastics material and is arranged to define a first channel 20 by means of which the seal 18 clips onto and is supported by the flange 14, and a second channel 22 which is of greater cross-section and receives the window glass 16. The seal may incorporate lips 24 and 26 which run along the length of the channel 22 and respectively seal against the side and periphery of the window glass 16 for draught and weatherproofing purposes.

The seal 18 may, if desired, incorporate an embedded metal reinforcement (not shown).

In order to hold the seal 18 securely in position on the flange 14, retaining strips 30 are provided. As shown in FIG. 1, there may be four such strips 30, running respectively along the four sides of the opening 12 but being clear of the corners in the opening. Each retaining strip 30 is channel-shaped but the distal edge of one wall of the channel is extended outwards at 32 to provide a flange or lip 33 which makes contact with the outside wall of that part of the seal 18 defining the channel 22.

Figure 4:
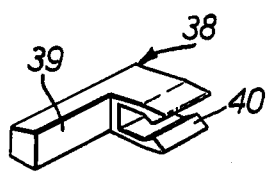
FIG. 4 is a perspective view of one of the parts of the arrangement of FIGS. 2 and 3.
Figure 5:
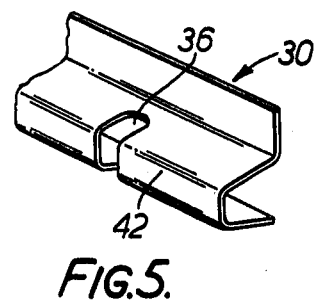
FIG. 5 is a perspective view of another of the parts of the arrangement of FIGS. 2 and 3.

In order to hold the retaining strip 30 in position, a series of pins 34 (see FIG. 3) are riveted or welded or otherwise suitably fastened to the surround 13 so as to project at intervals around the periphery of the opening 12 as indicated in FIG. 1, the pins 34 being on the outside of the opening. The retaining strips 30 are provided with slots 36 at corresponding intervals (see FIG. 5) and when the strips 30 are placed in position, the pins 34 are accommodated in the slots. The pins 34 interact with wedges 38 to hold the strips 30 in position. The wedges are illustrated in FIG. 4. Each one has a wedge portion 39 and jaws 40.

In operation, the windscreen glass 16 is first fitted into the channel 22 of the seal 18, and the latter is then placed in position in the opening 12 by engaging its channel 20 with the flange 14. The strips 30 are then placed in position around the periphery of the opening 12 so that their slots 36 clear the pins 34 and so that their flanges of lips 33 make contact with the outside wall of the seal 18. The wedges 18 are then placed into the channel portions of the retaining strips 30 and slid laterally so as respectively to come behind the pins 34, that is, between the pins 34 and the base 42 of the retaining strip 30. In this way, the retaining strips 30 are securely held in position.

Finally, a decorative beading 44 (omitted from FIG. 1) is placed in position and held there by means of a tongue portion 48, which extends longitudinally along the beading and which engages the jaws 40 of each wedge 38.

Figure 6:
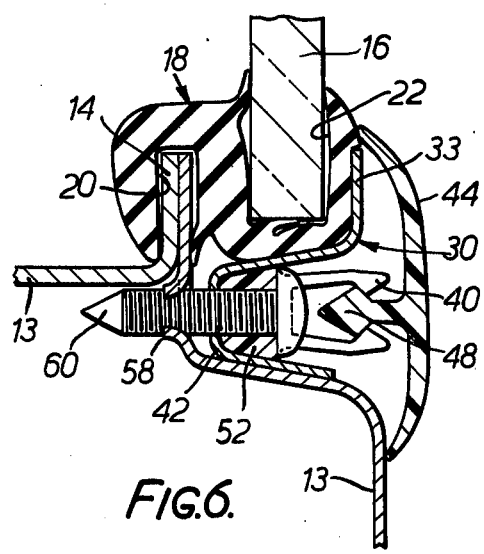
FIG. 6 is a section corresponding to FIG. 2 but showing a modified form of the arrangement.
Figure 7:
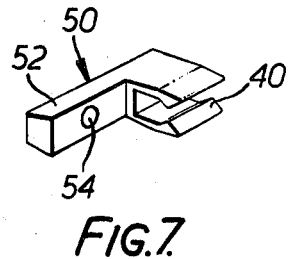
FIG. 7 is a perspective view of one of the parts of the arrangement of FIG. 6.
Figure 8:
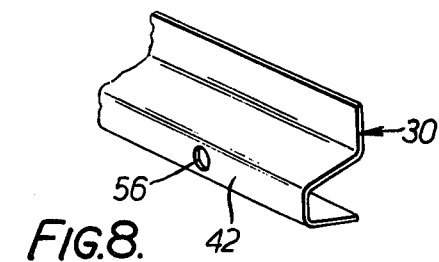
FIG. 8 is a perspective view of another of the parts of the arrangement of FIG. 6.

In FIGS. 6, 7 and 8, parts corresponding to those in FIGS. 2 to 5 are similarly referenced. The arrangement of FIGS. 6, 7 and 8 differs from that of FIGS. 2 to 5 in that the wedges 38 of the latter Figures are replaced by retaining members 50 each of which has an untapered extension 52 and the jaws 40. In addition, each extension 52 has a through hole 54 and corresponding holes 56 are provided at intervals along the length of the base 42 of each retaining strip 30, see FIG. 8. Finally, the surround 13 of the vehicle is provided with holes 58 (FIG. 6) at intervals, each such hole being threaded so as to receive and retain a respective bolt 60. Each bolt 60 passes through the hole 54 in one of the retaining members 50 and the corresponding hole 56 in the base 42 of the retaining strip 30. Instead of bolts, other types of suitable fixtures can be used.

The constructions shown in FIGS. 2 to 8 are merely examples of methods by which the retaining strips 30 can be held in position.

In each case, however, the purpose of the retaining strips 30 is securely to hold the windscreen glass 16 in position so that it is retained in position even under conditions of very rapid acceleration or deceleration, enabling the vehicle to pass stringent safety regulations. At the same time, however, the arrangements are such that the windscreen can be easily and rapidly fitted in position at low cost and can also be easily removed in the event of a repair being necessary.

Although the arrangements disclosed have been described with reference to the fitting of windscreens, it will be appreciated that they can be modified for fitting other window glass.

What is claimed is:

1. A sealing and retaining arrangement for sealing and retaining window glass in a window opening defined by a surround which supports a flange running around the opening, comprising
    flexible sealing means mounted on the flange and defining a channel receiving an edge of the window glass and running along the length of at least a portion of the flange,
    a stiff retaining member defining a longitudinal channel the distal edge of one of whose side walls is extended to define a longitudinally extending lip, the retaining member being positioned to run along the length of at least a portion of the said sealing means with the latter seating on an external wall of the channel of the retaining member so that the said lip makes contact with an external surface of the sealing means,
    pins extending through apertures in the retaining member at intervals along the said surround, and
    locking means including wedge-shaped locking members each of which is removably wedged between the inside of the base of the channel of the retaining member and a respective one of the said pins for releasably locking the retaining member to the said surround so that it retains the sealing means on the flange.

2. An arrangement according to claim 1, in which the pins are fixed to and upstanding from the said surround.

3. An arrangement according to claim 1, in which the sealing means comprises a member of resilient polymeric material defining two substantially parallel and longitudinally extending side-by-side channels facing in opposite directions, with one channel engaging the flange of the surround and the other channel receiving the periphery of the window glass.

4. A sealing and retaining arrangement for sealing and retaining window glass in a window opening defined by a surround which supports a flange running around the opening, comprising
    flexible sealing means mounted on the flange and defining a channel receiving an edge of the window glass and running along the length of at least a portion of the flange,
    a stiff retaining member defining a longitudinal channel the distal edge of one of whose side walls is extended to define a longitudinally extending lip, the retaining member being positioned to run along the length of at least a portion of the said sealing means with the latter seating on an external wall of the channel of the retaining member so that the said lip makes contact with an external surface of the sealing means,
    a decorative beading extending along the length of the surround and covering the open mouth of the channel of the retaining member, and
    locking means releasably locking the retaining member to the said surround so that it retains the sealing means on the said flange.

5. An arrangement according to claim 4, including gripping means positioned within the channel of the retaining member and in which the beading is held in position by locking engagement with the gripping means.

6. An arrangement according to claim 4, in which the sealing means comprises a member of resilient polymeric material defining two substantially parallel and longitudinally extending side-by-side channels facing in opposite directions, with one channel engaging the flange of the surround and the other channel receiving the periphery of the window glass.

7. A sealing and retaining arrangement for sealing and retaining a window glass in a window opening defined by a surround having a flange which runs around the opening and which lies in the plane of the opening and is directed inwardly of the opening, comprising
    a flexible sealing member defining first and second substantially parallel and longitudinally extending side-by-side channels facing in opposite directions and mounted with the first channel on and gripping the flange and the second channel on and gripping the periphery of the window glass,
    at least one longitudinally extending stiff retaining member defining a channel which is positioned between a part of the said surround and the second channel of the sealing member and turned through substantially 90° compared with the said second channel so that the outside of the base of the second channel rests on the outside of one of the side walls of the channel of the retaining member,
    the distal edge of one of the side walls of the channel of the retaining member being extended to define a longitudinally extending lip which makes retaining contact with the outside of a portion of the sealing member which defines the external wall of the second channel of the sealing member, locking means extending from the said surround and through apertures in the retaining member and releasably locking the retaining member to the surround so as to hold the retaining member in position on the surround and thus to hold the sealing means on the flange, and a decorative beading covering and removably fixed to the retaining member.

8. An arrangement according to claim 7, in which there are a plurality of the said retaining members each extending along the length of a respective relatively straight portion of the said surround, and in which the decorative beading is shaped to extend continuously along the length of all the said surround.

9. An arrangement according to claim 7, in which the locking means comprises a plurality of pins mounted at intervals on and along the said surround and extending through respective ones of the said apertures in the channel of the retaining member, and wedge-shaped members each wedged between the inside of the base of the channel of the retaining member and a respective one of the said pins.

10. An arrangement according to claim 7, in which the locking means comprises a plurality of threaded members each of which extends through a respective one of the apertures in the base of the channel of the retaining member and threadably engages the said surround.

11. An arrangement according to claim 7, in which the locking means carries clip means projecting towards the mouth of the channel of the retaining member and in which the decorative beading carries a plurality of cooperating means for respectively mating with the clip means, whereby to hold the decorative beading in position.

* * * * *